Sept. 28, 1937.   B. D. H. TELLEGEN ET AL   2,094,477
CIRCUIT ARRANGEMENT FOR AMPLIFYING AND/OR FREQUENCY
TRANSFORMATION OF ELECTRICAL OSCILLATIONS
Filed Sept. 4, 1935

INVENTORS
B.D.H. TELLEGEN - C. J. BAKKER
G. de VRIES
BY
ATTORNEY.

Patented Sept. 28, 1937

2,094,477

UNITED STATES PATENT OFFICE 2,094,477

CIRCUIT ARRANGEMENT FOR AMPLIFYING AND/OR FREQUENCY TRANSFORMATION OF ELECTRICAL OSCILLATIONS

Bernardus Dominicus Hubertus Tellegen, Gerrit de Vries, and Cornelis Jan Bakker, Eindhoven, Netherlands, assignors to N. V. Philips' Gloeilampenfabrieken, Eindhoven, Netherlands Application September 4, 1935, Serial No. 39,094
In Germany August 9, 1934

4 Claims. (Cl. 179—171)

Circuit arrangements for amplifying and/or frequency transformation of electrical oscillations usually comprise screen grid tubes in order to avoid feedback phenomena. The screen grids are usually at a comparatively high positive potential and the anodes have in most cases a materially higher potential. The latter is undesirable per se but necessary in view of the secondary emission phenomena usually occurring in such tubes having more than one positive electrode.

In the known arrangements the amplified voltages are taken off from the anode. Since the latter has a high positive potential it is required to provide a galvanic blocking, frequently constituted by a condenser, between the anode and the control grid of the succeeding tube. In this case a leakage resistance is necessary in order to give this grid the required bias. This blocking condenser and leakage resistance involve undesired complications, since they render the device larger and more expensive and may furthermore readily give rise to undue charging of the grid.

The present invention has for its purpose to use (different) high positive potentials and in addition to avoid the said condensers between amplifiers, so that the latter become simpler, smaller, lighter and cheaper, at the same time reducing the risk of distortion.

According to the invention this is achieved by causing the oscillations to be amplified and/or to be transformed in frequency to have a controlling action on a space charge set up inside the tube or tubes, this space charge inducing in its turn a correspondingly alternating charge on the electrode from which the amplified oscillations are to be derived. According to the invention this may be effected, for example, by impressing in an arrangement comprising one or more screened grid tubes, a negative bias on the plate electrode (s) of this (these) tube (s).
When a stream of electrons are accelerated in their movement in a certain direction, e. g. under the influence of a high-potential grid, and, after having passed through the meshes of said grid, are slowed down and even reversed in their direction by a further electrode of zero or negative potential, a space charge will be set up in the vicinity of said further electrode. If conditions remain unaltered, said space charge will be constant and so will its electrostatic effect on the adjacent electrode. All the electrons will end their journey through the valve on the high-potential grid and none of them will strike the electrode of negative potential.

If the stream of electrons, before passing through the positive grid, is controlled, e. g. by a control grid, the potential of which is varied, the density of the above noted space charge will vary accordingly thereby causing, by electrostatic induction, a corresponding movement of the free electrons to the adjacent (negative) electrode and the circuit connected therewith. Consequently, oscillations will be set up in said circuit of the same character as those impressed on the control grid.

The electrons, after having been repelled, will pass through the positive grid a second time, but now in inversed sense, and will be slowed down again in the space between the said positive grid and said (usually negative) control grid, whereby a second space charge is being set up in the vicinity of the control grid, on which it will have a similar influence as the one described above with respect to the first mentioned space charge. This influence, as a rule, will be undesirable. Therefore, means are suggested to render the formation of this second space charge impossible. This may be obtained e. g. by reducing the space between the two grids to a minimum.

The operation of an amplifier according to the invention is as follows:

The electrons attracted by the field of the positive screen grid traverse the control grid and for the greater part also the screen grid. Between the latter and the weakly negative plate they are retarded and reverse their direction of motion, whilst setting up a space charge between both of these electrodes.

This space charge varies with the alternating potential impressed on the control grid and consequently induces a correspondingly varying charge on the plate, this charge setting up an alternating current of the same frequency in the plate circuit.

When an oscillatory circuit or another high impedance tuned to this frequency is inserted in the plate circuit, considerable voltage variations will occur between the plate and the cathode.

This effect will obviously be stronger, as the frequency of the oscillations to be amplified is higher, at least within definite limits, since above this limit the time of revolution of the electrons begins to play a part. By reducing the distance between the screen grid and the plate this limit may be shifted upwardly.

On the other hand, however, a stronger space charge and consequently a greater amplification is achieved, when the distance between said electrodes is increased.

For this reason a compromise must be made with very high frequencies. In the wave range of 15 to 50 meters it was found that the optimum amplification is obtained at a distance of about 10 mm. between the screen grid and the plate, the impedance of the output circuit varying between 15,000 and 125,000 ohms.

It will be appreciated that the above electrode, which will simply be termed a "plate" herein, need not be a "full" electrode, since it does not attract electrons owing to its constant negative potential which is produced by one of the circuits associated with the tube, as described below. Therefore it does not play the part of the usual anode in that it does not receive a steady state component of electrons as in the usual amplifier tube where the anode is maintained at a high positive potential. However, current is caused to flow towards and away from the above mentioned plate due to the variations in the space charge between the screen grid and plate, these variations in turn being caused or controlled by the potential variations of the control grid due to the incoming signal currents. All the electrons emitted by the cathode thus eventually reach the screen grid which has a high positive potential. Since a steady electron current does not flow to the plate, it may be placed on the outer wall of the tube and its potential is then varied electrostatically by the space charge above noted.

This action is also effected by the secondary electrons emitted by the screen grid, which electrons will return again to this grid, and also by those primary electrons traversing more than once, and alternately in different directions, the meshes of the screen grid. These latter electrons will also set up a space charge between the screen and control grids and, since this charge is also controlled by the oscillations to be amplified, it will induce correspondingly varying charges in the control grid due to the proximity of this grid to the region of this space charge. Thus a reaction occurs which is generally to be considered undesirable. A means for eliminating this undesired effect or reducing it to a minimum consists, for example, in giving the control grid a size which is as small as possible or by placing the control grid as close as possible to the screen so that the negative charge on the control grid tends to prevent electrons from passing backwards through the meshes of the screen grid with the result that no substantial space charge can occur between them. Or, another way of preventing this undesirable effect is to provide the screen grid with a partition or baffle by which the electrons are prevented from passing several times through the screen grid which is particularly detrimental.

The following advantages are obtained over the known high frequency amplifiers comprising screen grid tubes:

1. Each tube comprises only one electrode having a positive potential, so that secondary emission has no influence.

2. This positive potential may be materially lower than that required in the usual arrangements under the same circumstances. A suitable value for the voltage of the screen grid is about 100 volts.

The plate may be given the same negative bias as that of the control grid so that in the case of cascade connection, direct conductive connections may be used between the stages. Consequently all technical and commercial objections inherent to the use of blocking condensers and leakage resistances or coupling coils are avoided.

These advantages are opposed by the sole objection that the obtainable amplification per stage is slightly smaller. With a wave length of 50 meters, however, the difference does not exceed 40% and with shorter wave lengths it is still smaller.

The invention will be more clearly understood by reference to the accompanying drawing in which two forms of embodiment are schematically represented.

Figure 1:
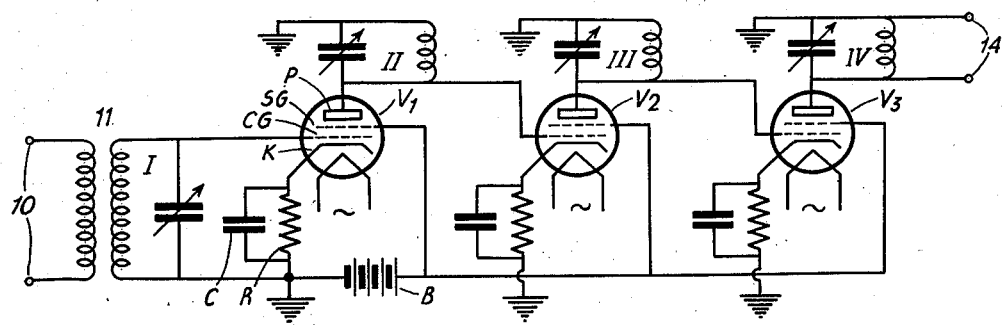
Figure 1 shows a triode high frequency amplifier according to the invention.

In Figure 1 the oscillations to be amplified across input terminals 10 are impressed through the high frequency transformer 11 on a circuit I which is tuned to these oscillations and is connected between the control grid CG and the cathode K of the tube $V_1$. Furthermore this tube comprises a screened grid SG which is connected to the positive terminal of a battery B and a plate P, which is connected to earth through a tuned circuit II.

The control grid CG is also earthed (through the circuit I), a bias resistance R bridged by a by-pass condenser C being connected between the cathode K and earth. Since the screen grid current traverses the resistance R both the control grid CG and also the plate P will receive a definite negative bias, for example, of some volts, with respect to the cathode since the control grid and plate are both conductively connected to the low potential end of R.

The distance between screen grid and plate must be given such a value that an appreciable space charge can be set up between these electrodes. However, this distance should not be so great that the time of revolution of the electrons inside this space plays a prominent part. A distance of about 10 millimeters is a suitable value in the case of amplifying waves of 15 to 50 meters and the impedance of the output circuit having a value between 15,000 and 125,000 ohms.

The plate P of $V_1$ is directly connected to the control grid of $V_2$, the plate of $V_2$ being connected in the same manner to the control grid of $V_3$. Since all these electrodes are at the same direct current potential, this is possible without any further means. In each case the plate circuit may be tuned to the signal frequency.

Figure 2:
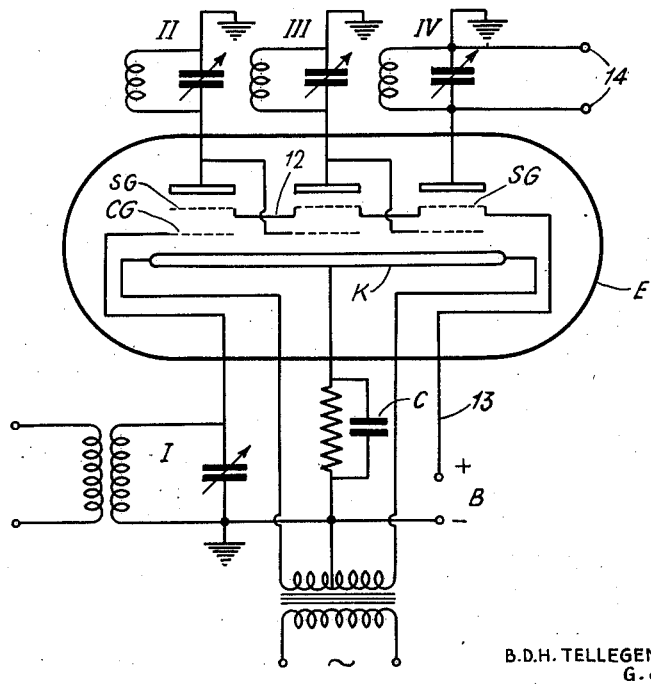
Figure 2 represents a form of construction in which the tubes have a common cathode and are mounted in a common glass envelope.

Moreover, this arrangement enables us to provide the form of construction shown in Figure 2, in which the three electron discharge devices are united inside a single exhausted envelope E. In the embodiment shown the common cathode is an elongated equipotential cathode K. Inside the tube the plates of the first and second system respectively are directly electrically connected to the control grids of the second and third devices respectively. The three screen grids SG are mutually connected inside the tube by leads 12 and furnished with a common outlet terminal 13. Consequently there are only six leading-out wires for the electrodes of the whole triple-system, besides the two supply wires for the heating current.

The principle according to the invention may be carried into effect in various other ways, if only provision be made that inside the tube a space charge whose value is varied by the oscillations to be amplified has an inducing action on the electrode from which the amplified oscillations are to be taken off. The oscillations to be amplified may, for example, be supplied to a grid provided between the screen grid and the plate, whereas the amplified oscillations are taken off from an impedance connected between the control grid and the cathode. In the embodiments shown they are taken off across the output terminals 14.

Having described our invention what we claim as novel and desire to secure by Letters Patent is:

1. An amplifying device comprising in combination, a vacuum tube having a cathode, a control grid, a screen grid and a plate, an input circuit connecting said control grid and cathode, means for maintaining said screen grid at a steady positive potential with reference to said cathode, a resonant circuit tunable to the frequency to be amplified and connected to said plate, and means for causing said plate and said control grid to assume an average negative potential with reference to said cathode.

2. Means for amplifying currents of a desired frequency comprising a vacuum tube having a cathode, a control grid, a screen grid and a plate, an input circuit resonant to the desired frequency connecting said control grid and cathode, a screen grid circuit including a source of positive potential connecting said screen grid and cathode, a resistor common to said input and screen grid circuits whereby said control grid is maintained at a negative bias potential, a conductive connection between said plate and the low potential end of said resistor and an output circuit connected to said plate.

3. In an amplifying device the combination of a vacuum tube having a cathode, a control grid, a screen grid and a plate, an input circuit connecting said control grid and cathode, means for maintaining said control grid and plate at an average negative potential with reference to said cathode, an output circuit connected to said plate, and means for applying a positive potential to said screen grid, said screen grid being located so close to said control grid that no space charge is set up therebetween.

4. In a vacuum tube circuit, an evacuated envelope containing an input set of elements comprising a cathode, a grid and an anode, and an output set of elements comprising said cathode, a grid and an anode, a direct connection between the first mentioned anode and the last named grid, an output circuit connected to said last named anode and means for maintaining said anodes and grids at a negative bias potential with reference to said cathode.

BERNARDUS DOMINICUS
    HUBERTUS TELLEGEN.
GERRIT DE VRIES.
CORNELIS JAN BAKKER.